United States Patent
Healy et al.

(10) Patent No.: US 10,601,777 B2
(45) Date of Patent: Mar. 24, 2020

(54) DATA INSPECTION SYSTEM AND METHOD

(71) Applicant: Corrata Limited, Blackrock, County Dublin (IE)

(72) Inventors: Colm Healy, Dublin (IE); Matthieu Bentot, Dublin (IE)

(73) Assignee: CORRATA LIMITED, Blackrock, County Dublin (IE)

( * ) Notice: Subject to any disclaimer, the term of this patent is extended or adjusted under 35 U.S.C. 154(b) by 290 days.

(21) Appl. No.: 15/896,508

(22) Filed: Feb. 14, 2018

(65) Prior Publication Data
US 2018/0241720 A1 Aug. 23, 2018

(30) Foreign Application Priority Data
Feb. 17, 2017 (EP) ..................................... 17156664

(51) Int. Cl.
| | | |
|---|---|---|
| *H04L 29/06* | (2006.01) | |
| *H04L 12/815* | (2013.01) | |
| *H04L 12/26* | (2006.01) | |
| *H04L 12/833* | (2013.01) | |
| *H04L 12/825* | (2013.01) | |

(52) U.S. Cl.
CPC .......... *H04L 63/0245* (2013.01); *H04L 43/04* (2013.01); *H04L 47/22* (2013.01); *H04L 47/31* (2013.01); *H04L 63/0227* (2013.01); *H04L 63/0236* (2013.01); *H04L 63/0272* (2013.01); *H04L 63/20* (2013.01); *H04L 69/22* (2013.01); *H04L 47/25* (2013.01)

(58) Field of Classification Search
None
See application file for complete search history.

(56) References Cited

U.S. PATENT DOCUMENTS

| | | | | |
|---|---|---|---|---|
| 7,099,947 | B1* | 8/2006 | Nadeau | H04L 63/0272 |
| | | | | 709/229 |
| 9,495,188 | B1* | 11/2016 | Ettema | G06F 9/45533 |
| 9,571,457 | B1* | 2/2017 | Hoy | H04L 63/20 |
| 9,813,379 | B1* | 11/2017 | Shevade | H04L 63/0272 |
| 9,860,208 | B1* | 1/2018 | Ettema | G06F 21/602 |
| 10,044,675 | B1* | 8/2018 | Ettema | G06F 9/45533 |
| 2003/0149787 | A1* | 8/2003 | Mangan | H04L 12/4641 |
| | | | | 709/238 |

(Continued)

OTHER PUBLICATIONS

Xu, Zheming et al. WAVNet: Wide-Area Network Virtualization Technique for Virtual Private Cloud. 2011 International Conference on Parallel Processing. https://ieeexplore.ieee.org/stamp/stamp.jsp?tp=&arnumber=6047197 (Year: 2011).*

(Continued)

*Primary Examiner* — Jeremiah L Avery
(74) *Attorney, Agent, or Firm* — Studebaker & Brackett PC (57) ABSTRACT

A method is performed by a user device for data inspection. A virtual private network (VPN) component of the device receives data traffic and routes it without encryption as a client to or from a destination server as a virtual private network server. The VPN component operates as a connection traffic forwarding bi-directional pipeline with traffic identification and as a connection traffic forwarding bi-directional pipeline with usage accounting, and as a connection traffic forwarding bi-directional pipeline with traffic manipulation.

22 Claims, 7 Drawing Sheets

(56) References Cited

U.S. PATENT DOCUMENTS

| | | | |
|---|---|---|---|
| 2005/0165834 A1* | 7/2005 | Nadeau | H04L 41/28 |
| 2008/0192739 A1* | 8/2008 | Carrasco | H04L 45/00 370/389 |
| 2009/0193513 A1* | 7/2009 | Agarwal | H04L 63/166 726/15 |
| 2015/0281408 A1 | 10/2015 | Kwan et al. | |

OTHER PUBLICATIONS

Puthal, Deepak et al. Cloud Computing Features, Issues and Challenges: A Big Picture. 2015 International Conference on Computational Intelligence Networks. https://ieeexplore.ieee.org/stamp/stamp.jsp?tp=&arnumber=7053814 (Year: 2015).*

* cited by examiner

DATA INSPECTION SYSTEM AND METHOD

INTRODUCTION

Field of the Invention

The invention relates to inspection of data being communicated to and/or from a user device such as a smartphone or computer.

Prior Art Discussion

Desktop operating systems provide APIs that allow third parties to alter the behaviour of the networking stack by injecting code into the kernel. For example, Windows™ has NDIS™ drivers, the Winsock™ kernel, or the Windows Filtering Platform™. Linux™ has net filter modules. These allow third parties to provide services such as virtual private networks (VPNs) and firewalls.

A firewall monitors the network traffic and blocks it if it is deemed a security threat, or otherwise unwanted.

A VPN (virtual private network) client redirects (and usually encrypts) chosen (or all) traffic to a different computer (the VPN server). This then forwards it to the intended recipient, receives the responses, and sends them back to the original computer. In effect, software running on the original computer is seen by the rest of the world as if it was running on the VPN server, inside the private network (hence the name). This allows it to participate in the private network security infrastructure, by it being allowed access to services otherwise forbidden to outside computers, and having unwanted traffic blocked.

Such modification of the computer's behaviour is a security threat, and this is only allowed to software granted administrative privileges. Even so, neither iOS™ nor Android™ allow such arbitrary code injection. They do, however, provide a limited API which allows third parties to implement VPNs.

Figure 1:
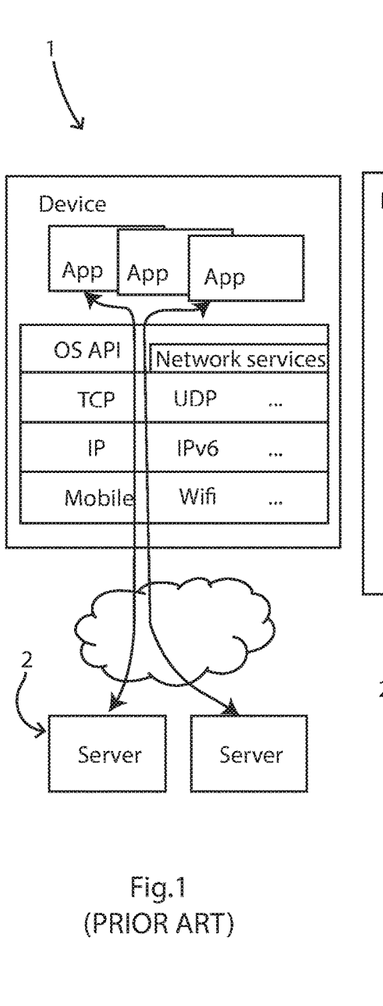
FIGS. 1 and 2 are diagrams showing prior art communication paths between a device application and a server both without and with use of a VPN respectively.

In more detail, FIG. 1 shows the standard behaviour of a network stack. In a device 1, applications use the Operating System (OS) Application Programming Interfaces (APIs) to open and close connections or send data. This is transformed into TCP or UDP (or other transport layer protocols) packets. This is encapsulated in IP or IPv6 (or other Internet layer protocols) packets. These are handed over to the Link-layer, which manages the actual physical transfer over the air (Mobile network, WiFi), wire (Ethernet), or any other suitable medium, to the Internet and ultimately to the destination servers 2. Network traffic coming from the destination follows the same path in reverse, and the application receives the data using OS APIs. Some supporting network services (e.g. DNS) are used transparently by the OS, and their network traffic follows the same path.

Figure 2:
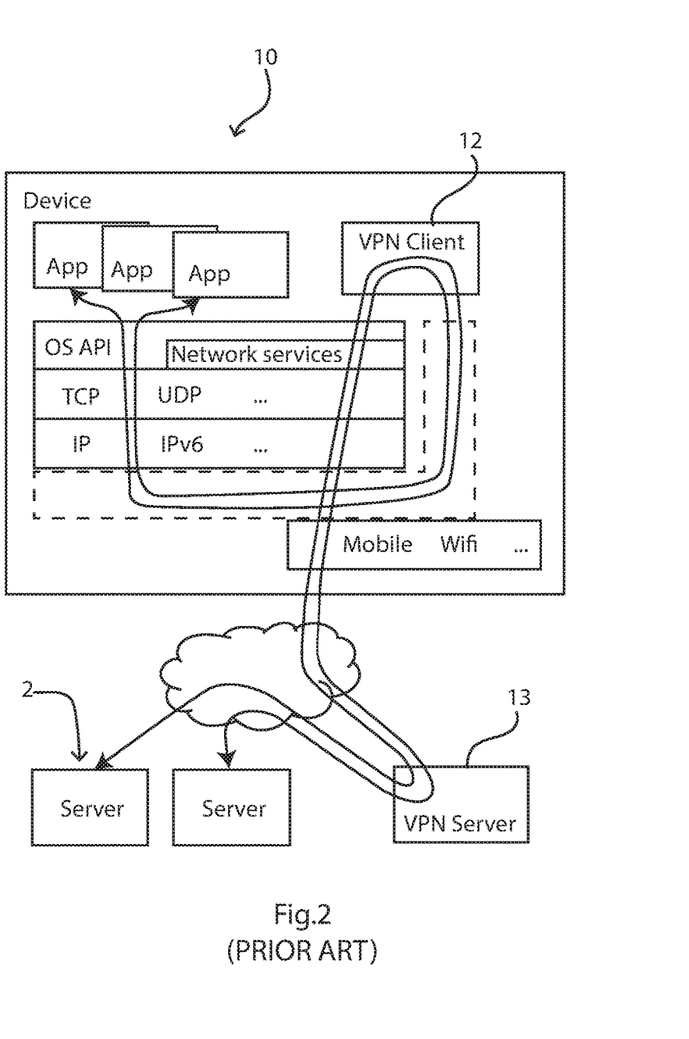

FIG. 2 shows how this may be altered in a device 10 when using a Virtual Private Network (VPN). Between the Internet and Link layers, the network traffic is redirected by the OS to a special program, the VPN client 12. The client 12 forwards it to a specific VPN server 13, after suitable encryption. This VPN server 13 decrypts it and forwards it to the original destination. Again, network traffic coming from the destination follows the same path in reverse.

US2015/0281408 (Pismo Labs Tech.) is an example of a system using a VPN for identifying data sessions.

The invention is directed towards providing improved and/or simpler processes for data inspection.

Glossary

In this specification the terms "network stack" means the stack in conventional devices such as smartphones, alternatively referred to as the protocol stack, and on which the Application Layer (HTTP protocol) resides. It typically includes the following layers, with the typical protocols indicated in brackets:

Transport Layer (TCP protocol)
Internet/Network Layer (IP protocol)
Link Layer (Ethernet)
Physical Layer (IEEE 802.3u)

References to these layers in the specification include variations as would be readily understood by those skilled in the art. This is also the case for other acronyms used in the specification, the meaning being that which is understood by persons skilled in the field of the invention, for example:

OS means the device's operating system
VPN means virtual private network
DPI means deep packet inspection

SUMMARY OF THE INVENTION

We describe a method performed by a user device for data inspection, the user device comprising at least one network interface, a network stack, an Application Layer residing on the stack, a VPN component residing on said network stack and being configured for bi-directional routing between applications in said Application Layer and external servers, and said VPN component including a policy manager. The method includes some or all of the steps of the VPN component:

receiving data traffic and routing it in a manner to mimic a VPN client to or from destination servers directly, without a virtual private network server, operating as a connection traffic forwarding bi-directional pipeline with traffic identification and with traffic manipulation, performing deep packet inspection, tagging network traffic with information from a device Internet Layer and a device Transport Layer, and with information decoded from device Application Layer-protocols, altering network traffic including performing traffic re-direction, dropping, termination, content change, throttling and/or change of encryption, and requesting, with the policy manager, a full or partial policy from a policy server.

Preferably, the VPN component routes said data without encryption. Preferably, the VPN component operates as a connection traffic forwarding bi-directional pipeline with usage accounting.

Preferably, the VPN component usage accounting tracks network traffic at the level of bytes and packets.

Preferably, the VPN component usage accounting tracks tags inserted by the VPN component.

Preferably, the VPN component performs traffic manipulation by altering network traffic based on policies determined by the policy manager.

Preferably, the policy manager of the VPN component automatically manages overall operation of the VPN component.

In one aspect, the policy manager automatically requests full or partial policies according to conditions which are detected.

Preferably, a policy includes rules with parameters for any or all of time, location, connection type, network operator, traffic identification tags, and/or usage caps.

Preferably, the VPN component performs one or more of the following operations:

identify a destination by IP address by decoding an IP packet;

identify traffic type by port by decoding TCP or UDP or other internet level packet;
run deep packet inspection on the traffic by reconstructing application level traffic and then fully or partially decoding it to identify the actual type;
run deep packet inspection on traffic by reconstructing application level traffic and then fully or partially decoding it to extract an intended host name, which may or may not match the IP address;
run deep packet inspection on traffic by reconstructing application-level traffic and then fully or partially decoding it to extract other Application Layer level information, such as Transport Layer Security TLS encryption; and
measure traffic by host and/or service.

Preferably, the VPN component executes manipulation rules based on results of evaluation of conditions using parameters, said rules including one or more of:
blocking a tag (blacklisting) in an internet level protocol specific manner, or deciding not to black (whitelisting), and/or
re-directing a combination of tags by changing either a destination IP address and/or an internet level protocol port, and/or
mobile usage control, for example in a general location category, when usage in that category for a period, and/or
in the same conditions, but additionally the tags match a category, do not block (whitelisting), and/or
throttling outgoing traffic by dropping or delaying forwarding of packets, and/or
throttling incoming traffic by intermittently pausing its processing.

Preferably, the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component.

Preferably, a final inspection function passes its output to the policy manager which decides an onward communication with a server according to a policy.

Preferably, a message sent to the server by the policy manger is augmented by successive layer of the device stack.

Preferably, the VPN component operates as a state machine, with states based on status of connection with a server.

Preferably, the states include states for:
connected to server, but waiting for acknowledgement from a device application, and/or
connections established, with bi-directional communicators between the device applications and the server, and/or
connected to server but pending shut-down caused by acknowledgement from application, and/or
connection closed.

Preferably, said functions include a deep packet inspection function which inspects traffic payload and adds application-levels tags, and maintains a state that allows it to resume processing when the next packet is available.

Preferably, said policy manager determines a policy from the policy manager before invoking said deep packet inspection function, to bypass the deep packet inspection function processing if the internet packet and transport packet tags are sufficient to determine an applicable policy.

Preferably, the device VPN component comprises a transport-level decoder function and the policy manager directs said function to close a connection between a device application and a server, or to modify the content, or to use a different connection.

Preferably, the VPN component reverses effects of network traffic crossing the device, in which it reverses effects of the device Network Stack so that the device operating system redoes these effects on the way to the server, and applies the effects of the network stack for the device operating system to undo them on the way from the server, so that the VPN component mimics the effect of inserting itself between the Internet layer and Link Layer.

We also describe a user device having a processor and a user interface and a remote communication interface, in which the processor is configured to perform the steps of a method of any embodiment.

We also describe a non-transitory computer readable medium comprising software code for performing steps of a method of any embodiment when executing on a digital processor.

Additional Statements

According to the invention, there is provided a method performed by a user device for data inspection, the method comprising a virtual private network (VPN) component of the device receiving data traffic and routing it as a client to or from a destination server as a virtual private network server.

In one embodiment, the VPN component routes said data without encryption.

In one embodiment, the VPN component operates as a connection traffic forwarding bi-directional pipeline with traffic identification.

In another embodiment, the VPN component operates as a connection traffic forwarding bi-directional pipeline with usage accounting.

In one embodiment, the VPN component operates as a connection traffic forwarding bi-directional pipeline with traffic manipulation.

In one embodiment, the VPN component performs deep packet inspection.

In another embodiment, the VPN component tags network traffic with information from an Internet layer and a Transport layer.

In one embodiment, the VPN component tags the network traffic with information decoded from application level protocols. Preferably, the VPN component usage accounting tracks network traffic at the level of bytes and packets. In one embodiment, the VPN component usage accounting tracks tags inserted by the VPN component.

In one embodiment, the traffic manipulation alters the network traffic based on policies. In one embodiment, the altering includes re-direction, dropping, termination, content change, throttling and/or change of encryption.

In one embodiment, a policy manager of the VPN component manages overall operation of the VPN component.

In one embodiment, the policy manager requests full or partial policies according to conditions which are detected. Preferably, a policy includes rules with parameters for any or all of time, location, connection type, network operator, traffic identification tags, and/or usage caps.

In a further embodiment, the policy manager requests a full or partial policy from a policy server.

In one embodiment, the VPN component performs one or more of the following operations:
identify a destination by IP address by decoding an IP packet;

identify traffic type by port by decoding TCP or UDC or other internet level packet;

run deep packet inspection on the traffic by reconstructing application level traffic and then fully or partially decoding it to identify the actual type;

run deep packet inspection on traffic by reconstructing application level traffic and then fully or partially decoding it to extract an intended host name, which may or may not match the IP address; and measure traffic by host and/or service.

Preferably, the VPN component executes manipulation rules based on results of evaluation of conditions using parameters, said rules including one or more of:

blocking a tag (blacklisting) in an internet level protocol specific manner, or deciding not to black (whitelisting), and/or re-directing a combination of tags by changing either a destination IP address and/or an internet level protocol port, and/or mobile usage control, for example in a general location category, when usage in that category for a period, and/or in the same conditions, but additionally the tags match a category, do not block (whitelisting), and/or throttling outgoing traffic by dropping or delaying forwarding of packets, and/or throttling incoming traffic by intermittently pausing its processing.

In another aspect, the invention provides a user device having a processor and a user interface and a remote communication interface, in which the processor is configured to perform the steps of a method of any embodiment.

In a further aspect, the invention provides a non-transitory computer readable medium comprising software code for performing steps of a method of any embodiment when executing on a digital processor.

DETAILED DESCRIPTION OF THE INVENTION

Brief Description of the Drawings

The invention will be more clearly understood from the following description of some embodiments thereof, given by way of example only with reference to the accompanying drawings in which:—

DESCRIPTION OF THE EMBODIMENTS

Figure 3:
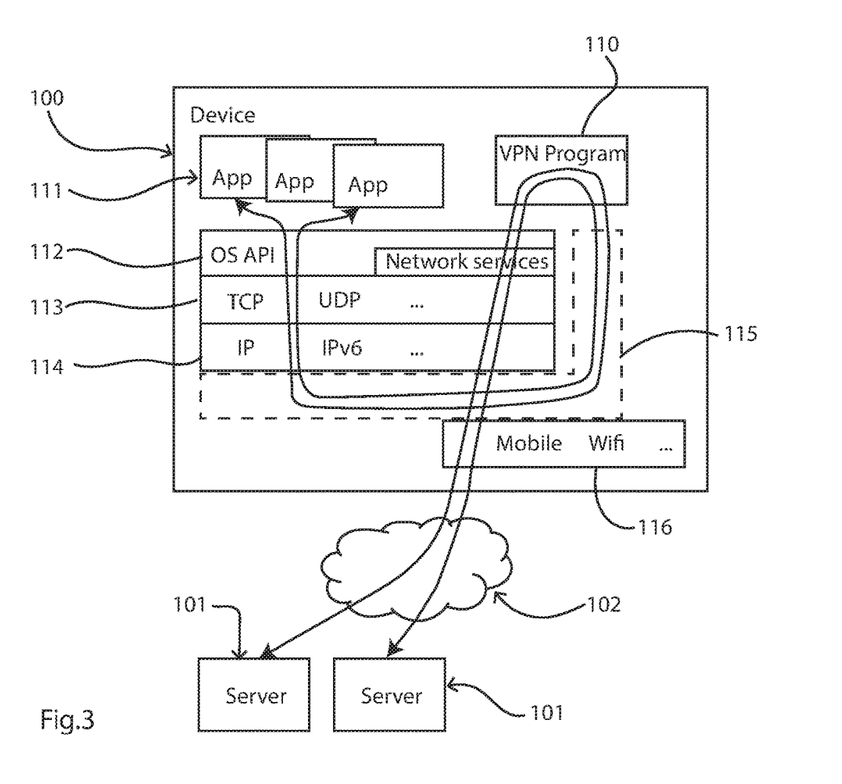
FIG. 3 is a diagram illustrating routes of the invention using a VPN program component within the user device.
Figure 4:
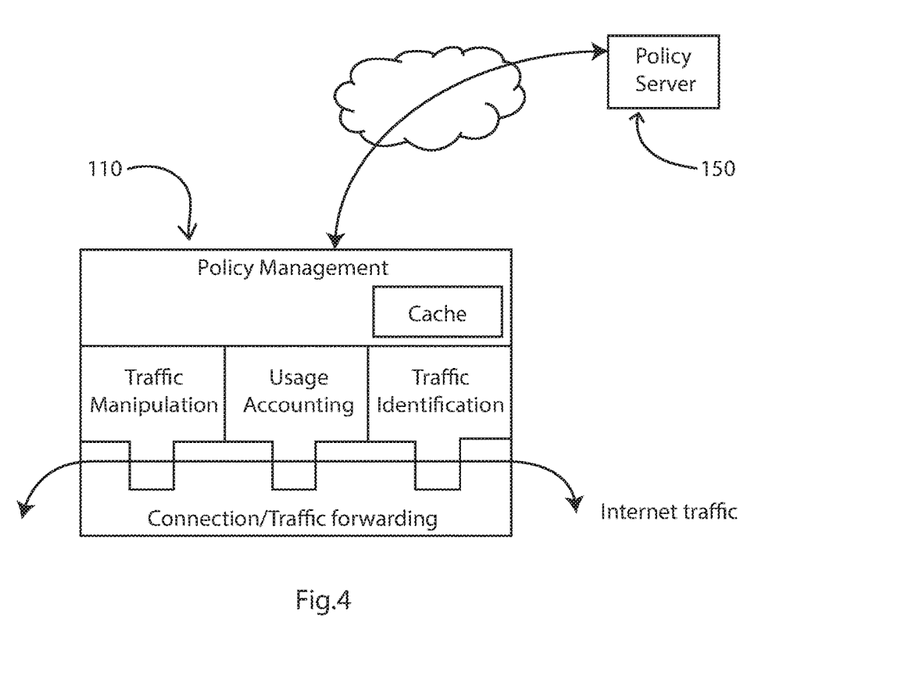
FIG. 4 is a block diagram showing the VPN program component in more detail.

Referring to FIGS. 3 and 4 a VPN program component 110 runs on a user device 100 and uses a VPN client API. The VPN program 110 acts as a VPN client but directly routes traffic to the server originally intended by the application. By reversing the effects of the Network Stack itself and then having the OS redo these effects (on the way to the server), and conversely by applying the effects of the network stack for the OS to undo them (on the way from the server), the VPN client mimics the effect of inserting itself between the Internet layer and Link Layer.

In various embodiments the VPN program component 110 can perform one or more of the following operations:

Identify the general destination of a message received in either direction by IP address by decoding the IP packet.

Identify the traffic type by port by decoding the TCP or UDP or other Internet-level packet—when a well-known port is used.

Run deep packet inspection on the traffic by reconstructing the application-level traffic and then fully or partially decode it to identify the actual type, which may or may not match the port when it identifies a type.

Run deep packet inspection on the traffic by reconstructing the application-level traffic and then fully or partially decoding it to extract the intended host name, which may or may not match the IP address.

Run deep packet inspection on traffic by reconstructing application-level traffic and then fully or partially decoding it to extract other Application layer level information, such as TLS encryption method.

Measure traffic by host and/or service.

This information can then be used to perform one or more of the following operations:

Manipulate traffic based on policy rules.

Filter or shape traffic based on a policy by blocking specific sites (e.g. porn, gambling), limiting the bandwidth available to others (e.g. YouTube™), or capping overall usage to a certain amount (e.g. 1 Gb/month).

Allow key services to remain available regardless of usage.

Change applicable limitations based on the actual network connection type (e.g. Wifi vs. mobile), location (e.g. home network vs. roaming), or time of day (e.g. business hours).

FIG. 3 shows the logical location of the VPN component 110 in the device 100. It is alongside an Application Layer with applications 110, over a stack of an API layer 112, a TCP layer 113 and an IP layer 114. For clarity, not all of the seven layers of conventional protocol stack are shown. For example a Link layer is below the Internet layer and above the Physical layer at the bottom of the stack. A bypass route 115 to the VPN component 110 is shown. The bypass route 115 redirects conventional outbound network traffic from the device network stack to the VPN program component 110 before it reaches the Link layer, and allows the VPN program to inject packets into the bottom of the IP stack, the Internet layer, as if they were coming from the Link layer.

The device 100 also has network interfaces 116 as is conventional. The hardware of the device 100 may be of any conventional smartphone or tablet for example. A bi-directional route from an applications 111 to the VPN component 111 is down the stack 112-114 and up through the bypass route 115. Communication with the servers 101 is via the stack 112-114 in both directions, the VPN component 110 being in the application level 111.

FIG. 3 also shows how the VPN component 110 facilities provided by the OS are used in the invention. Instead of sending outgoing network traffic to a VPN server, the VPN program 110 forwards it directly to the intended destination (and the reverse in the opposite direction). In a way, VPN client and VPN server functionality are merged in the VPN program 110. Specifically the VPN program component 110 includes functionality in its program code for interfacing with the operating system normally found in a VPN client and connection and traffic management functionality normally found in a VPN server. The VPN program also includes functionality to both reverse (on the way to the server) and execute (on the way to the application) the effects of the network traffic crossing the Network Stack. The key aspect is that by doing this the VPN program in effect transparently positions itself within the network stack between the Internet Layer and Link Layer, which may not be otherwise supported or allowed by the OS.

FIG. 4 shows the internal functions of the VPN program component 110 in more detail. Network traffic goes through a connection/traffic forwarding subsystem that performs various functions. It includes traffic identification functions which tag the network traffic with information from the internet layer (e.g. internet layer type, IP address) and transport layer (e.g. transport layer type, ports) encapsulation. Also, as more data is transferred, information is decoded from the application level protocols (i.e. Deep Packet Inspection).

Also, usage accounting functions keep track of the number of bytes and packets (when possible) transmitted and received, overall for combinations of the month or day, policy parameters and network connection type (as specified by the policy), and for the tags or combinations of tags as identified by the previous subsystem. Usage information for network traffic not yet fully identified is stored and aggregated when identification completes.

Traffic manipulation functions alter the network traffic based on policy. They can redirect connections to a more suitable server, for example based on geographical location (Internet layer level manipulation), or impose a different DNS server. They can simply terminate connections (Transport layer level manipulation). They can change the application level content, for example to impose a higher level of TLS encryption, or cause a redirect from an unencrypted HTTP to an encrypted HTTPS site. It can also delay and throttle traffic (traffic shaping).

This process is controlled by a policy manager within the VPN component 110, which in turn retrieves policy data from the external policy server 150. The policy manager periodically retrieves the policy from the server after a set expiration date, or upon receiving a notification to do so from the server.

It may also request a partial policy when the policy does not specify a behaviour for the traffic that was identified (for example, an unknown site). In this case the policy server 150 replies with the correct behaviour, but may also add the correct behaviour for similar traffic, or traffic deemed likely to occur following the traffic that triggered the request. Those partial policies may be held in a cache for a period of time to improve performance and avoid overburdening the server. The policy manager may also upload the usage information to the server.

A policy contains a set of general parameters and a set of rules, and for example may include:
- month and day definitions, and applicable time zone(s);
- day and hours categories (e.g. work day vs. week-end);
- general location categories and the countries or mobile network providers they cover (e.g. domestic—Ireland, roaming EU—EU countries, bar Ireland, roaming others—everything else);
- traffic identification tags or combination of tags categories; and
- usage caps based on the above parameters and network connection type.

The rules describe the manipulation to execute based on the result of the evaluation of conditions using the parameters. These rules include the following:
- A tag is blocked (blacklisting) in an internet level protocol specific manner e.g. outgoing UDP traffic is not forwarded and TCP connections trigger a RST packet.
- The combination of tags "UDP and port 53" is be redirected (DNS redirection) by changing either the destination IP address and/or the internet level protocol port.
- Mobile usage, in a general location category, when usage in that category for the day (as computed by the usage accounting subsystem) exceeds a cap, is blocked (capping) in an internet level protocol specific manner e.g. outgoing UDP traffic is not forwarded and TCP connections trigger a RST packet.
- In the same conditions, but additionally the tags match a category, do not block (whitelisting).
- Throttling the outgoing traffic by dropping or delaying forwarding of packets.
- Throttling incoming traffic by intermittently pausing its processing.

Figure 5:
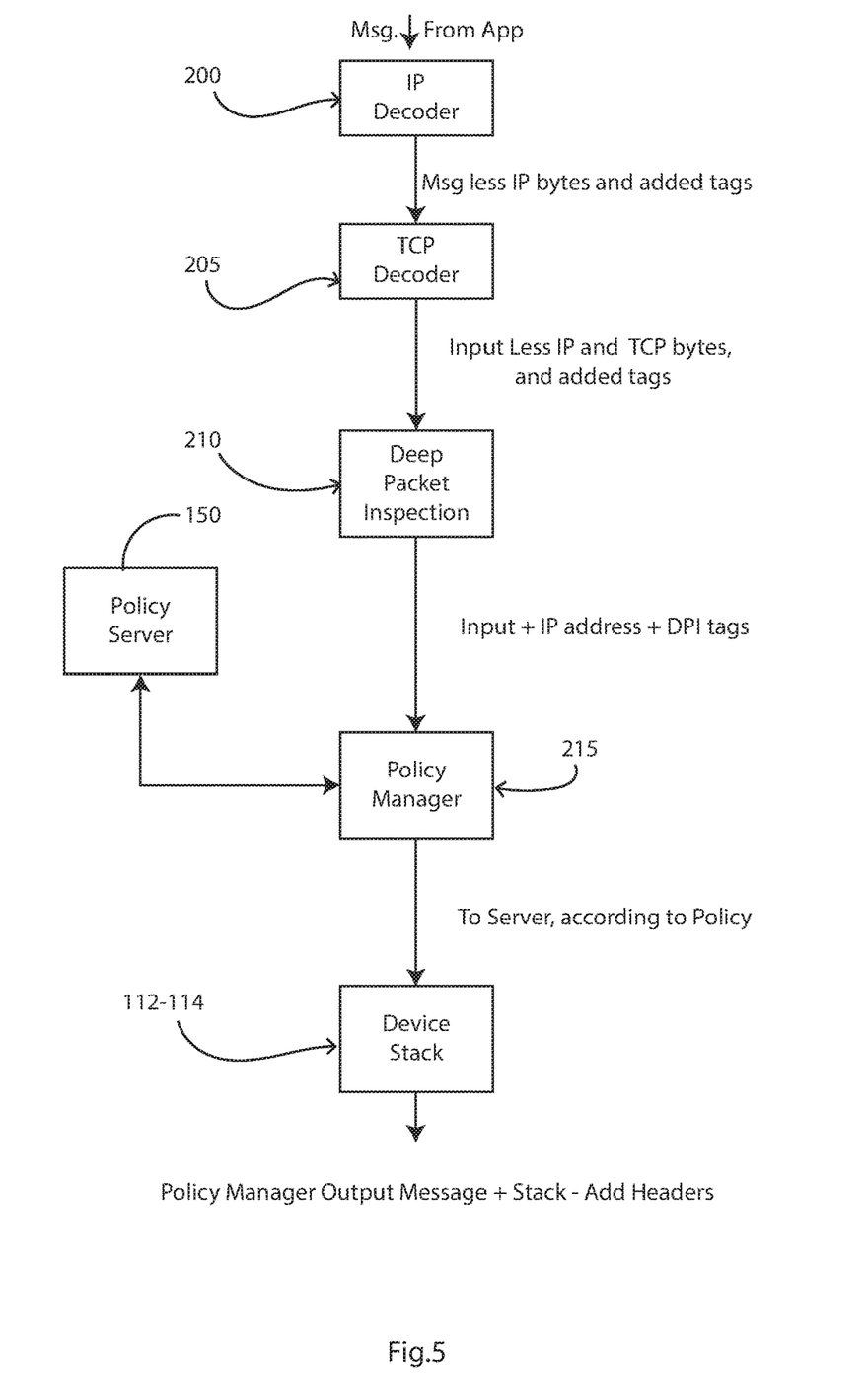
FIG. 5 is a flow diagram showing operation of the VPN component in more detail.

Referring to FIG. 5 the VPN component 110 has an IP decoder 200, a TCP decoder 205, a Deep Packet Inspection (DPI) function 210, and a policy manager (215). Taking the important example of a message sent by an application 111 in the device 100, the following steps are performed:

The IP decoder 200 strips out the IP bytes and performs IP recognition before sending on the message less these bytes, but with IP tags.

The TCP decoder 205 extracts the TCP bytes, examines them, and generates tags representative of the TCP level, for example port identifiers. In other embodiments there may alternatively or additionally be a UDP decoder performing equivalent operations.

The DPI function 210 inspects the message payload and adds IP addresses and DPI tags. The DPI function 210 inspects the TCP payload and adds Application levels tags. Unlike the IP and TCP decoders, which operate on a single packet, the DPI may need to consider several packets, or possibly the entire flow, to complete. It maintains a state that allows it to resume processing when the next packet is available. It may add DPI tags at any point during this processing.

The policy manager 215 receives the output of the DPI function 210 and processes all of the tags to determine an action for onward routing to the server 101. The output is routed through the stack 112-114 to the server 101.

Figure 6:
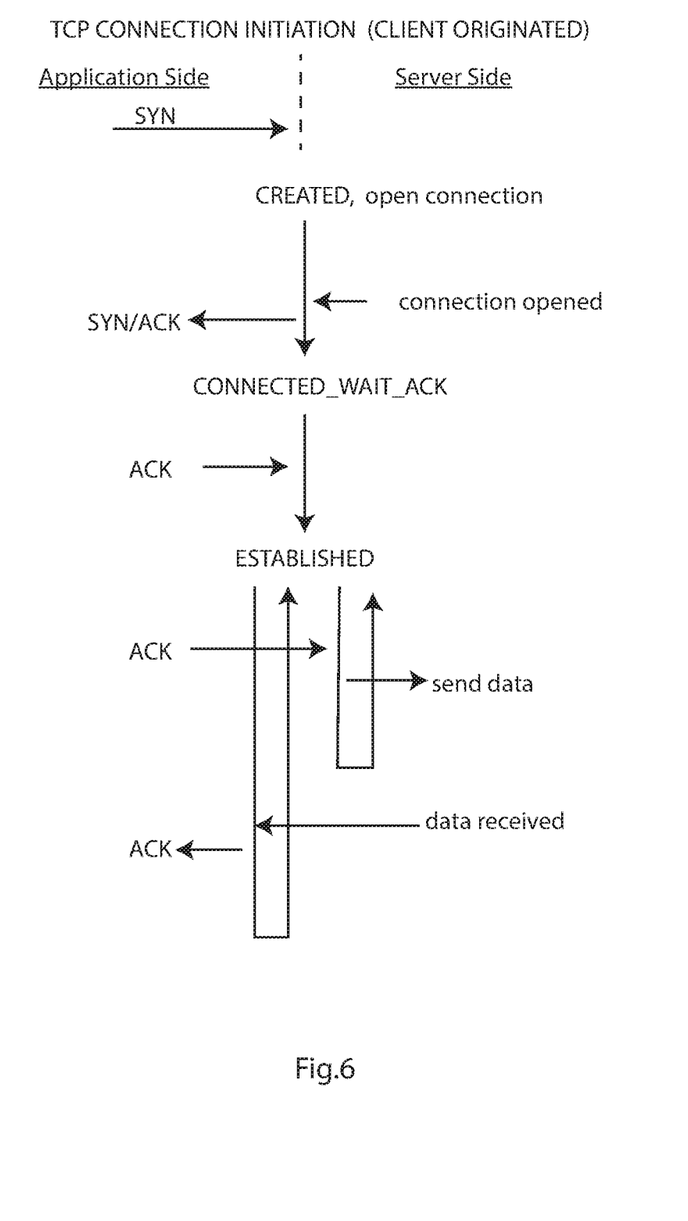
FIGS. 6 to 9 are state diagrams illustrating operation of functions of the VPN component in more detail.

State diagrams for operation of the VPN component 110 are as follows:

FIG. 6—TCP Connection Initiation

| State | Operations |
|---|---|
| CREATED | 110 sends an "open" connection request to the server 101. Server 101 responds |

-continued

| State | Operations |
|---|---|
| | Server110 informs applications, via the device stack 112-114 (SYN/ACK) |
| CONNECTED_WAIT_ACK | Acknowledgement (ACK) from application with TCP bytes inserted by the stack |
| ESTABLISHED | Left hand loop receive process receives ACK from the server and sends an ACK containing this data to the device application. Right hand loop send process receives an ACK containing application-originated data and sends this data to the server. The outcome is that the VPN component 110 transparently forwards data both from the device application to the server and from the server to the device application. |

Figure 7:
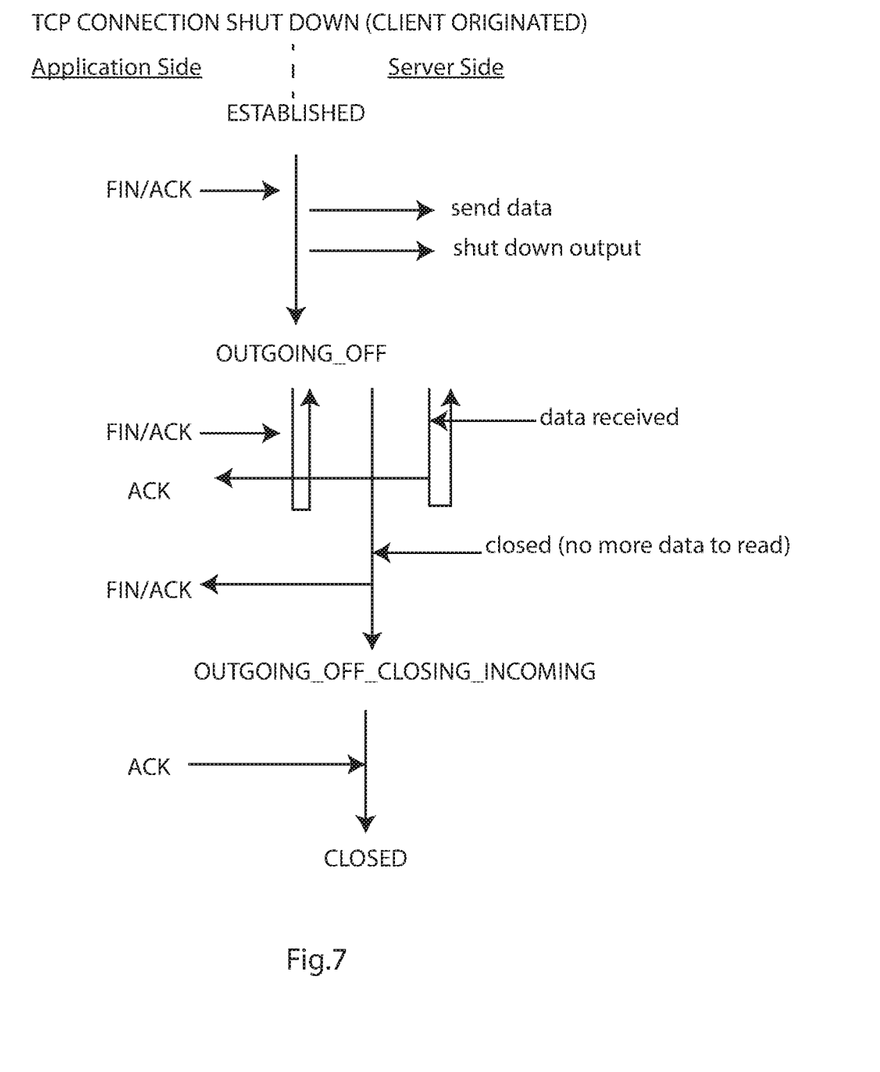

FIG. 7—TCP Connection Shut Down

| State | Operations |
|---|---|
| ESTABLISHED | An application sends a message to 110 that it wishes to terminate the connection (FIN/ACK) 110 sends data to the server, and directs the OS to shut down the output. |
| OUTGOING - OFF | 110 application process receives redundant FIN/ACK message, which is ignored 110 server process receives server-originated data and sends a corresponding acknowledgement (ACK) to the application. It then receives a "closed" message indicating that there is no more data to read. Acknowledgement of termination of server data sent to application (FIN/ACK). |
| OUTGOING_OFF_CLOSING_INCOMING And CLOSED | 110 receives sends an acknowledgement (ACK) to the application |

Figure 8:
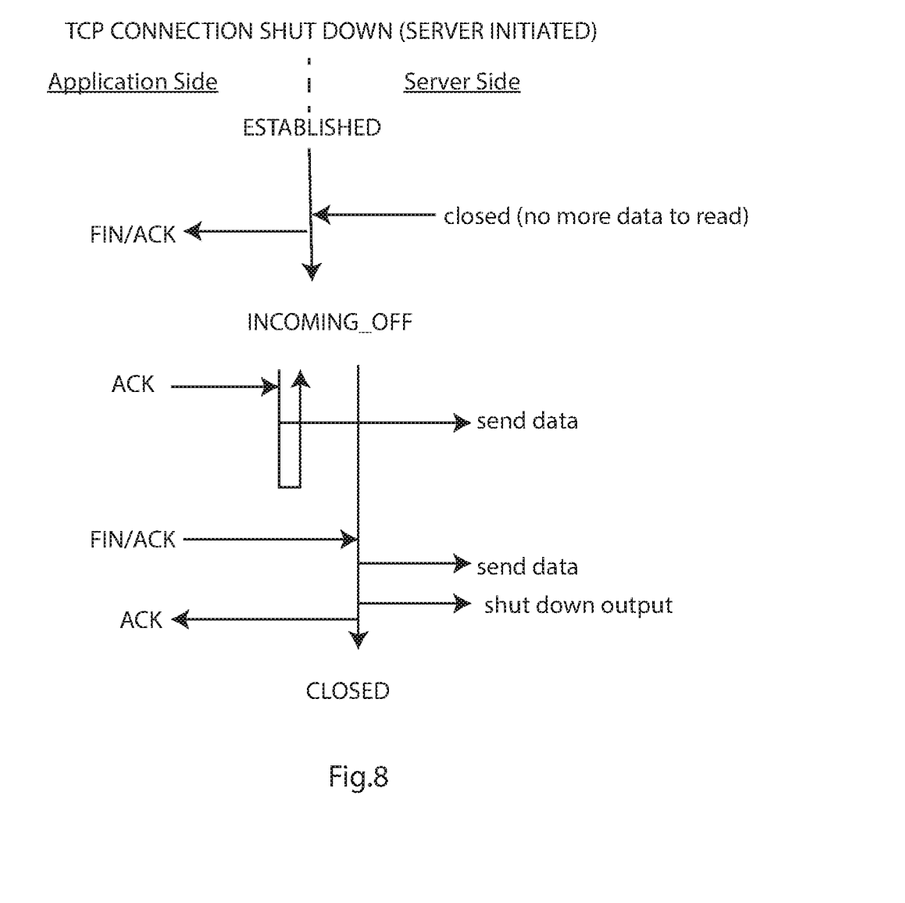

FIG. 8—Server-initiated TCP Connection Shutdown

| State | Operations |
|---|---|
| ESTABLISHED | Server informs 110 that there is no more data to send VPN component 110 informs the device application, via the OS (FIN/ACK) |
| INCOMING_OFF | 110 application-side process receives acknowledgement (ACK) from application, possibly with new data, and sends data to server |
| CLOSED | Shutdown acknowledged (FIN/ACK) received from application, data sent to server together with a shutdown output, and acknowledgement (ACK) sent to application. |

Figure 9:
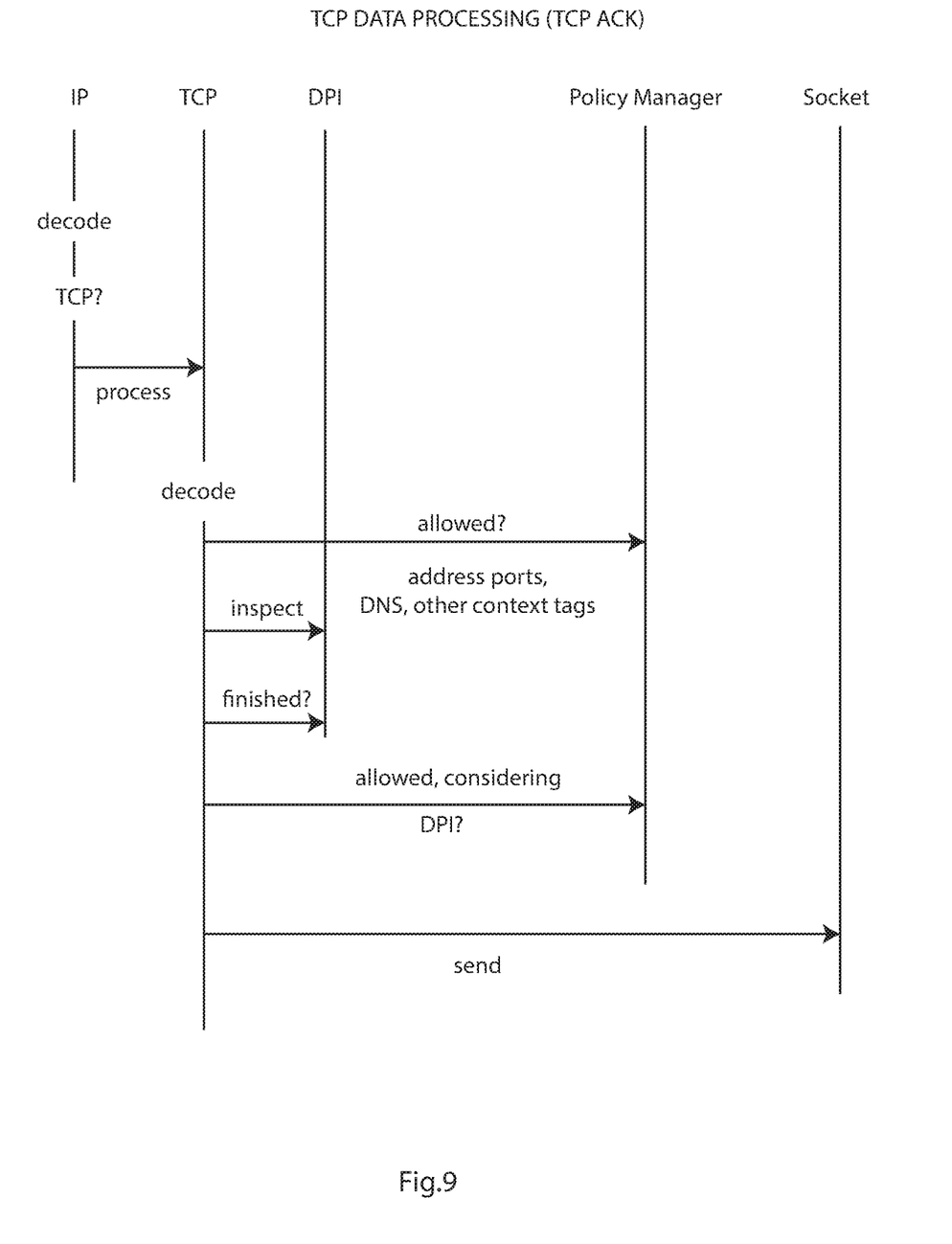

FIG. 9, Interaction of Functions 200, 205, 210, 215

The IP decoder 200 decodes, and if it recognizes a TCP packet, it informs the TCP decoder 205. This decodes the TCP information, adds TCP tags, and sends data on to the DPI function 210. It determines a policy from the policy manager 215 and, if allowed by the policy, sends data to the socket for onward routing to the server.

Options for Policy Manager 215

Advantageously, the TCP decoder may try to determine a policy from the policy manager before invoking the DPI function. This allows bypassing the DPI processing if the IP and TCP tags are sufficient to determine the applicable policy.

The TCP decoder routes to the server via the stack, which adds IP and TCP headers. Alternatively, the TCP function may do nothing if the state is unchanged, and the data was already sent.

The policy manager 215 may direct the TCP function to close the connection, or to modify the content, or to use a different connection (for instance, using TLS). Content modification may be a removal of a name from a DNS query or answer.

Advantageously, the VPN component 110 provides low-level (IP packets). The API which the device can communicate to the outside world are high-level (standard socket APIs). 110 mimics the protocol state machine internally and issues high-level calls to make the OS replicate The packets it just forwarded to the VPN client The component 110 has various means to tag traffic, often pertaining to a single traffic flow. This is achieved by flow tagging. Tagging may also occur across traffic flows, and a major example is DNS. DNS is used to convert domain names to IP addresses (similar to a phone direction). The VPN component 110 runs DNS deep packet inspection, and store the result. It can then refer back to this information to attach a domain name to a different traffic flow based on its IP address.

The device can also tag traffic based in outside context, for example the identity of the WiFi network. For example, it could allow traffic if the WiFi network is identified as the corporate WiFi. Or, it could deny traffic, or unencrypted traffic, if the WiFi network is deemed insecure. The VPN component 110 receives messages from the device 1 operating system as if it were an external server It may block specific sites (~160). Other examples include phishing sites and malware command and control servers.

The component 110 can also do traffic manipulation to alter the content of the traffic. One example, for outbound traffic, is if a DNS request contains queries for both a legitimate domain name and a malicious one, we can remove the malicious query before forwarding the request to the DNS server. Another example, for inbound traffic, is if a DNS reply refers to an IP address, or a domain name, that is deemed malicious, we can transform the reply to indicate that the domain requested does not exist.

Policy updates, or partials policy updates, can be queried anonymously for privacy reasons. This is done by querying the policy server about several policies at the same time without sending a unique user or device identifier. Only the client knows which policy is the right one; the server cannot know which policy the device actually belongs to.

The cache) to hold partial policies may be stored on permanent storage on the device to persist during app or device restarts.

Cached partial updates may have an associated time-to-live after which the client should request an update from the server. The client, however, may keep using the cached update if, for instance, the server is unavailable.

The invention is not limited to the embodiments described but may be varied in construction and detail.

The invention claimed is:

1. A method performed by a user device for data inspection, the user device comprising at least one network interface, a network stack, an Application Layer residing on the stack, a VPN component residing on said network stack and being configured for bi-directional routing between applications in said Application Layer and external servers, and said VPN component including a policy manager,
the method comprising the VPN component:
receiving data traffic and routing it in a manner to mimic a VPN client to or from destination servers directly, without a virtual private network server,
operating as a connection traffic forwarding bi-directional pipeline with traffic identification and with traffic manipulation,
performing deep packet inspection,
tagging network traffic with information from a device Internet Layer and a device Transport Layer, and with information decoded from device Application Layerprotocols,
altering network traffic including performing traffic re-direction, dropping, termination, content change, throttling and/or change of encryption, and
requesting, with the policy manager, a full or partial policy from a policy server.

2. The method as claimed in claim 1, wherein the VPN component routes said data without encryption.

3. The method as claimed in claim 1, wherein the VPN component operates as a connection traffic forwarding bi-directional pipeline with usage accounting.

4. The method as claimed in claim 1, wherein the VPN component operates as a connection traffic forwarding bi-directional pipeline with usage accounting, and wherein the VPN component usage accounting tracks network traffic at the level of bytes and packets.

5. The method as claimed in claim 1, wherein the VPN component operates as a connection traffic forwarding bi-directional pipeline with usage accounting, and wherein the VPN component usage accounting tracks tags inserted by the VPN component.

6. The method as claimed in claim 1, wherein the VPN component performs traffic manipulation by altering network traffic based on policies determined by the policy manager.

7. The method as claimed in claim 1, wherein the policy manager of the VPN component automatically manages overall operation of the VPN component.

8. The method as claimed in claim 1, wherein the policy manager automatically requests full or partial policies according to conditions which are detected.

9. The method as claimed in claim 1, wherein a policy includes rules with parameters for any or all of time, location, connection type, network operator, traffic identification tags, and/or usage caps.

10. The method as claimed in claim 1, wherein the VPN component performs one or more of the following operations:
identify a destination by IP address by decoding an IP packet;
identify traffic type by port by decoding TCP or UDP or other internet level packet;
run deep packet inspection on the traffic by reconstructing application level traffic and then fully or partially decoding it to identify the actual type;
run deep packet inspection on traffic by reconstructing application level traffic and then fully or partially decoding it to extract an intended host name, which may or may not match the IP address;
run deep packet inspection on traffic by reconstructing application-level traffic and then fully or partially decoding it to extract other Application Layer level information, such as Transport Layer Security TLS encryption; and
measure traffic by host and/or service.

11. The method as claimed in claim 1, wherein the VPN component executes manipulation rules based on results of evaluation of conditions using parameters, said rules including one or more of:
blocking a tag (blacklisting) in an internet level protocol specific manner, or deciding not to black (whitelisting), and/or
re-directing a combination of tags by changing either a destination IP address and/or an internet level protocol port, and/or
mobile usage control, for example in a general location category, when usage in that category for a period, and/or
in the same conditions, but additionally the tags match a category, do not block (whitelisting), and/or
throttling outgoing traffic by dropping or delaying forwarding of packets, and/or
throttling incoming traffic by intermittently pausing its processing.

12. The method as claimed in claim 1, wherein the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component.

13. The method as claimed in claim 1, wherein the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component; and wherein a final inspection function passes its output to the policy manager which decides an onward communication with a server according to a policy.

14. The method as claimed in claim 1, wherein the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component; and wherein a message sent to the server by the policy manger is augmented by successive layer of the device stack.

15. The method as claimed in claim 1, wherein the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component; and wherein the VPN component operates as a state machine, with states based on status of connection with a server.

16. The method as claimed in claim 15, wherein the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component; and wherein the VPN component operates as a state machine, with states based on status of connection with a server; and wherein the states include states for:
- connected to server, but waiting for acknowledgement from a device application, and/or
- connections established, with bi-directional communicators between the device applications and the server, and/or
- connected to server but pending shut-down caused by acknowledgement from application, and/or
- connection closed.

17. The method as claimed in claim 1, wherein the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component; and wherein said functions include a deep packet inspection function which inspects traffic payload and adds application-levels tags, and maintains a state that allows it to resume processing when the next packet is available.

18. The method as claimed in claim 1, wherein the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component; and wherein said functions include a deep packet inspection function which inspects traffic payload and adds application-levels tags, and maintains a state that allows it to resume processing when the next packet is available; and wherein said policy manager determines a policy from the policy manager before invoking said deep packet inspection function, to bypass the deep packet inspection function processing if the internet packet and transport packet tags are sufficient to determine an applicable policy.

19. The method as claimed in claim 1, wherein the VPN component comprises a plurality of inspection functions, each corresponding to a layer of a stack of the device, and each inspection function inspects an incoming message for associated data, extracts any such data, adds a tag representative of the associated layer, and passes the received message less the extracted bytes and plus the tags to a next inspection component; and wherein said functions include a deep packet inspection function which inspects traffic payload and adds application-levels tags, and maintains a state that allows it to resume processing when the next packet is available; and wherein said policy manager determines a policy from the policy manager before invoking said deep packet inspection function, to bypass the deep packet inspection function processing if the internet packet and transport packet tags are sufficient to determine an applicable policy; and wherein the device VPN component comprises a transport-level decoder function and the policy manager directs said function to close a connection between a device application and a server, or to modify the content, or to use a different connection.

20. The method as claimed in claim 1, wherein the VPN component reverses effects of network traffic crossing the device, in which it reverses effects of the device Network Stack so that the device operating system redoes these effects on the way to the server, and applies the effects of the network stack for the device operating system to undo them on the way from the server, so that the VPN component mimics the effect of inserting itself between the Internet layer and Link Layer.

21. A user device having a processor and a user interface and a remote communication interface, in which the processor is configured to perform the steps of a method of claim 1.

22. A non-transitory computer readable medium comprising software code for performing steps of a method of claim 1 when executing on a digital processor.

* * * * *